United States Patent [19]
Pollack et al.

[11] Patent Number: 5,150,452
[45] Date of Patent: Sep. 22, 1992

[54] METHOD AND APPARATUS FOR ANTI-COLLISION AND COLLISION PROTECTION FOR MULTIPLE ROBOT SYSTEM

[75] Inventors: Steven H. Pollack, Washington Crossing, Pa.; Brian D. Hoffman, Somerville, N.J.

[73] Assignee: Megamation Incorporated, Lawrenceville, N.J.

[21] Appl. No.: 387,222

[22] Filed: Jul. 28, 1989

[51] Int. Cl.$^5$ .................................................. G06F 9/00
[52] U.S. Cl. ...................................... 395/90; 364/461
[58] Field of Search ............... 364/518, 521, 522, 513, 364/461, 462; 395/90, 135

[56] References Cited

U.S. PATENT DOCUMENTS

| | | | |
|---|---|---|---|
| 4,437,085 | 3/1984 | Salant | 340/286 M |
| 4,578,757 | 3/1986 | Stark | 364/461 |
| 4,586,151 | 4/1986 | Buote | 364/513 |
| 4,727,494 | 2/1988 | Buote | 364/513 |
| 4,764,873 | 8/1988 | Libby | 364/461 |
| 4,888,707 | 12/1989 | Shimada | 364/513 |
| 4,890,241 | 12/1989 | Hoffman et al. | 364/513 |

OTHER PUBLICATIONS

Sjolund et al, "Robot Task Planning: Programming Using Interactive Computer Graphics", pp. 7-12-2-7-135 1983.
Okino et al, "Robot Simulator in Jipsl Geometric Simulator" Robotics & Computer Integrated Manufacturing vol. 3, No. 4, pp. 429-437, 1987.
Heginbotham et al, "Rapid Assessment of Industrial", Robots Performance by Interactive Computer Graphics, pp. 563-574, 1979.

*Primary Examiner*—Heather R. Herndon
*Attorney, Agent, or Firm*—Louis Weinstein

[57] ABSTRACT

Collision detection in a multi-robot system. A "map" of the "world" is stored in memory. A collision map containing a desired robot move is created. The initial position of the desired robot is removed from the "world" map by combining the robot map and the "world" map in a logical exclusive-OR operation and thereafter combining the collision map and the "world" map in a logical exclusive-OR operation followed by combining the collision map and the "world" map in a logical "inclusive-OR" operation in a byte-by-byte manner. A collision is indicated by a difference in any bit position of the inclusive and exclusive-OR combinations. The lack of any difference indicates that the move may be made. Similar logic operations are performed to partially and ultimately totally deallocate an allocated path and for considering alternative moves or partial moves responsive to the presence of a "collision". The method is performed using a computer which may be no more sophisticated than a conventional personal computer (i.e. PC) in which calculations are capable of being performed within a millisecond, which operating speed favorably compares with the movement of a robot which requires of the order of one second.

41 Claims, 12 Drawing Sheets

*Fig. 2*

TYPICAL WORD FOR ROW 1, COLUMNS 1 – 32

| 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

BIT 1 ... BIT 32

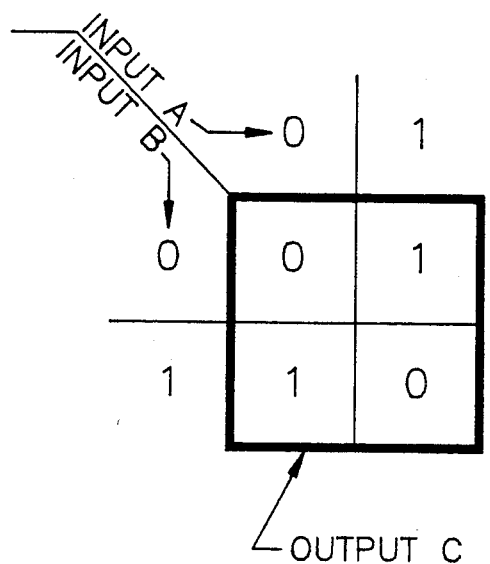
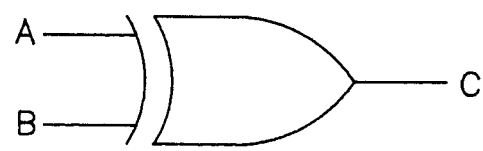
*Fig. 8a*  *Fig. 8b*
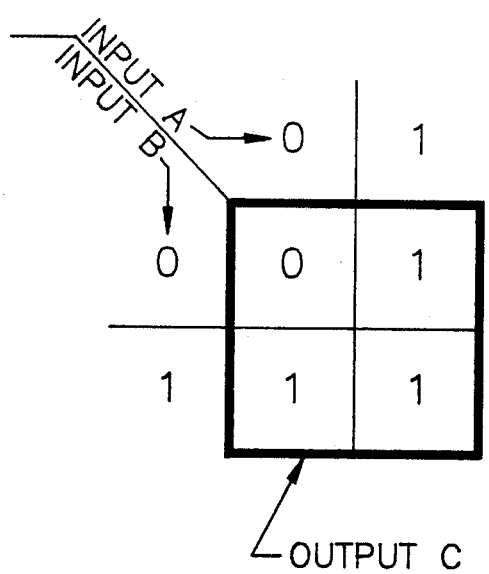
*Fig. 9a*  *Fig. 9b*

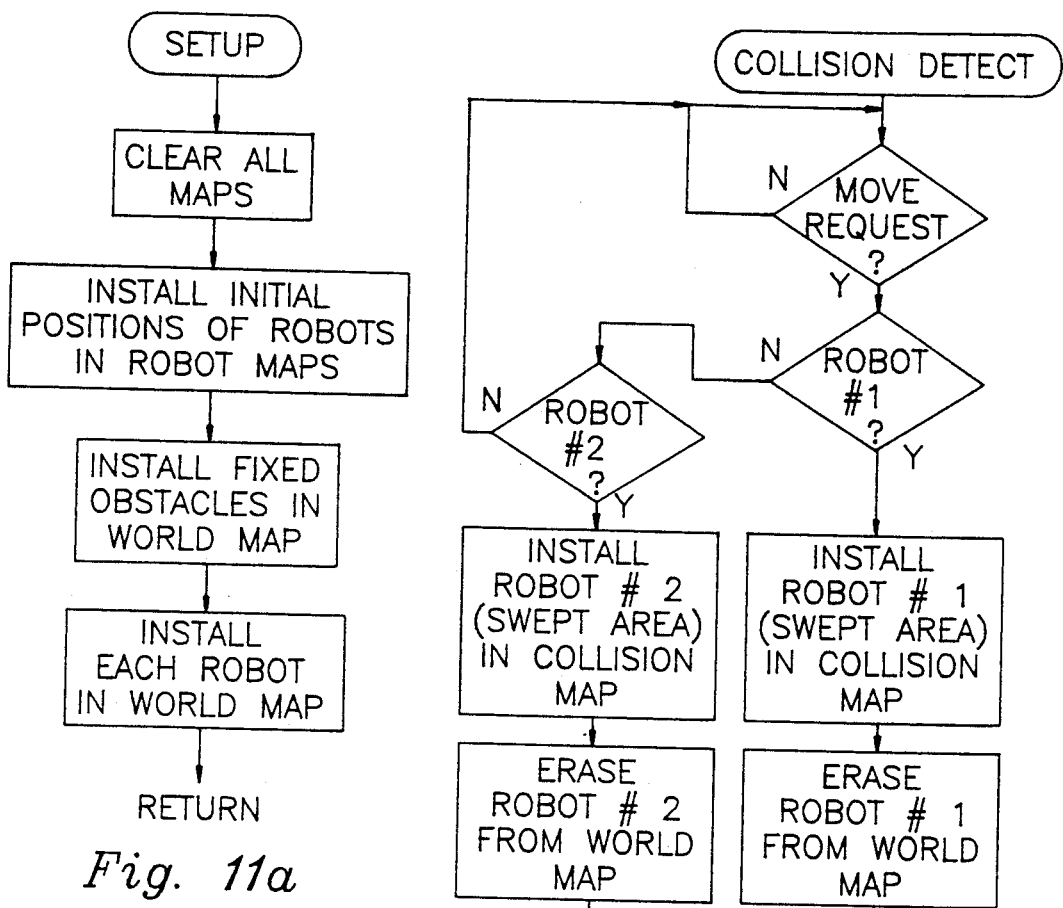
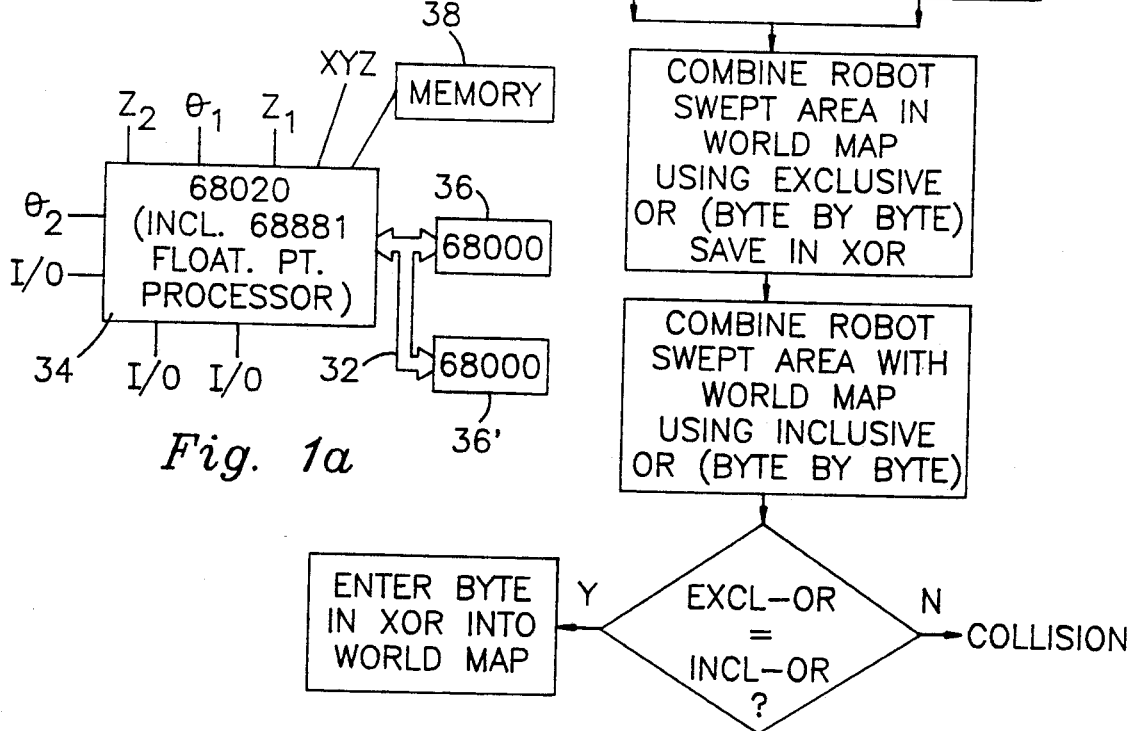
Fig. 11a
Fig. 1a
Fig. 11b

METHOD AND APPARATUS FOR ANTI-COLLISION AND COLLISION PROTECTION FOR MULTIPLE ROBOT SYSTEM

FIELD OF THE INVENTION

The present invention relates to robotic systems and more particularly, to a novel collision detection apparatus and method for use in a multiple robot system.

BACKGROUND OF THE INVENTION

One of the major problems to be addressed in any multiple robot system is the problem of the collision of a robot arm with another robot arm. Still another problem, faced even in a single robot system, is that of an arm colliding with a fixed obstacle, such as a parts feeder or a part already mounted upon the workpiece during a previous operation.

One of the important advantages of a robot automation work station is its throughput, that is, the amount of work it can perform in a given time and space. Present day robot systems have attempted to increase throughput by making the robot move and/or work faster. Present day robot systems attempt to prevent the occurrence of collisions by comparing the anticipated move of each device sequentially with every other device in an effort to recognize the collision and determine its source. This is unnecessarily time consuming and is further unnecessarily complicated.

BRIEF DESCRIPTION OF THE INVENTION

The approach of the method and apparatus of the present invention toward the anti-collision problem is to break the problem down into a collision-detect phase and a recovery (evasive-action) phase. During the collision-detect phase, the 3-D collision-detect problem is broken down into a 2-D xy detection in which the robot bodies are projected onto a common plane which may be considered to be the ceiling of the work station and a 1-D height comparison (which may be omitted in many cases). If no collision is detected for a given proposed move, the move is allowed. If an impending collision is detected, "evasive" action is taken. The most time-consuming part of this approach is the time required for the collision-detect calculations.

The algorithm employed in the present invention for performing collision-detect is a graphical approach in which "maps" are constructed for each robot arm in the system and for the "world" including all robots and fixed articles. In order to "move" a robot, the area swept out by the robot is drawn in its robot map as an appropriate series of dots. An attempt is then made to "install" the robot map into the world map by inserting all "on" dots from the robot map into the world map. If all of the robot map dots are successfully transferred to the world map, the move is deemed "non-colliding". The presence of the robot map dots in the world map automatically "allocate" the space needed for performing a non-colliding move.

When a move is completed, the allocated space in the world map must then be deallocated. All of the "on" dots on the robot map are used to turn off their corresponding dots in the world map. The robot is then drawn in its present "rest" position on the robot map and the "rest" image is then installed in the world map.

As can clearly be seen, the collision detection works correctly and automatically regardless of the number of other robots that are already "installed" in the world map, and works for any combination of moving and stationary robots. In fact, the approach also works in the presence of an arbitrary number of fixed obstacles, represented as a series of permanently installed "on" dots in the world map. The algorithm of the present invention recognizes that it is often not important to determine what the robot is colliding with, but rather that it is sufficient to determine the fact of a non-free space in which to make the proposed move.

The calculation time of the aforementioned novel algorithm is independent of the number of robots or fixed articles, and depends only upon the "fineness" (i.e. "resolution") of the map grids (i.e. how many "dots" are required to represent the work envelope) and the area swept out by the proposed moves.

The system of the present invention employs a plurality of small robots working quickly and cooperatively in a common space. For example, in a two-arm work station, competing robots must typically be twice as fast as the robots of the present invention in order to obtain equivalent throughput, and no known presently available robot is twice as fast as any one of the robot arms of the present invention. As can be expected, three and four arm work stations offer even more throughput for the same given floor space, and the present invention may be used to great advantage in three and four arm robot systems.

The robot arms of the present invention are powered by electro-magnets attracted to a "platen" by permanent magnets and move along the platen on a layer of compressed air. Power in the form of electricity and decompressed air is transmitted to each robot arm from a control cabinet by means of an umbilical cord attached to the machine frame.

The system solves the additional problem of keeping a robot arm from wrapping around the umbilical cord of another robot arm (which may be considered to be a form of an arm "colliding" with the umbilical cord of another arm). Since the robot arms are constantly reacting to changing conditions (via their sensors), any anti-collision solution must be capable of being determined quickly, often in real-time. "Real-time" in this context means determining an anti-collision strategy fast enough that the throughput of the work station is uneffected, or minimally effected, by the calculation of the strategy.

In many robot work stations, and particularly in the work station in which the present invention may be used to great advantage, "collisions" often need only be considered in the xy plane since the robot arms are substantially comprised of rectangular solids moving along an upper plate and hence 3-D with another robot is predictable from the 2-D (xy) projection on the upper plate. Furthermore, any collision with a fixed obstacle can usually be considered as 2-D projection, with the obstacle's height considered separately. Thus, a general 3-D collision problem can often be broken down into two smaller problems, namely, the 2-D collision projected on the upper plate and the 1-D height collision. In many cases, the "height" collision provides no new information beyond a 2-D result and its calculation can be entirely omitted.

Thus, during the collision-detect phase, the 3-D collision-detect problem is decomposed into a 2-D xy detection (in which the "footprint" of the robot is projected onto the upper plate) and a 1-D height comparison (which may be omitted in most cases). In the event that no collision is detected for a given or proposed move, the move is allowed. If an impending collision is detected, "evasive action" is taken, which ranges from simply waiting for the needed space to free up to making attempted moves around the block space (of course, any "attempted" move must also be checked for possible collisions).

The most time-consuming part of the approach is the collision-detect phase and, through an efficient "detect" algorithm, many "evasive actions" can be considered and tested for collisions, in real-time.

The collision-detect algorithm of the present invention utilizes a graphical approach in which "maps" are constructed for each robot arm in the system and for the "world" of all robots and fixed obstacles. In order to permit a "move", the area swept out by the robot is drawn in its robot map as an appropriate series of dots. An attempt is then made to "install" the robot map into the world map by moving all of the "on" dots in the robot map into the world map. If all of the robot map dots are successfully transferred to the world map, the move is deemed "non-colliding" and the presence of the robot map dots in the world map "allocate" the space needed for making a non-colliding move.

The graphic technique involves the construction of "xy" work envelope maps which represent the projection of the work envelope on the ceiling (platen) of the work station which is represented by a quantized grid made up of uniform grid squares, each representing a predetermined area of uniform size. Each grid square is represented by a single bit of a computer word stored in memory.

Upon the receipt of a request for a move, the entire area swept out by the robot body and its umbilical cord is drawn in its robot map. All of the dots for those squares swept by the robot moving from its initial position to the final position, together with the squares representing the area occupied by the umbilical cord are turned "on". The initial position of the robot for which movement is requested is then removed from the world map by combining all of the dots of the robot map and the world map in a logical "exclusive-OR" operation. Thereafter, the swept out area of the robot collision map is combined with the world map initially employing a logical "exclusive-OR" operation, followed by combining said maps employing a logical "inclusive-OR" operation in which bytes of predetermined bits of the two maps are successively combined using the aforementioned logical operations. The results of the logical operations are compared one with the other and in the event that there are any differences in any of the squares, a collision conditions results, halting the collision-detect operation and preventing the allocation of the desired space.

The swept area is then removed from the world map by combining the collision map with the world map in a logical "exclusive-OR" operation to remove the attempted allocation from the world map. Thereafter, either alternative routes may be attempted to be allocated or a stationary recovery mode may be utilized during which the robot is maintained stationary for a predetermined delay period before another attempted allocation is initiated. In the event that no collision condition is present after performing the aforementioned logical exclusive-OR and inclusive-OR operation, the robot movement is automatically allocated on a byte-by-byte basis and remains as a part of the world map, preventing the swept area from being allocated.

Deallocation may take place either upon completion of the robot movement or may take place as a multiphase operation in which a portion of the swept area vacated by the moving robot may be deallocated.

The recovery moves attempted after a collision condition is detected comprise a series of allocation attempts for alternative routes to the final location from the initial location and also may include a limited number of incremental steps which advance the robot generally toward the final location with an effort toward seeking an allocation upon the completion of each incremental step. The number of incremental steps are limited in order to prevent the robot from moving beyond the boundary of the work space.

The techniques employed to determine a collision or non-collision state are simple and are performed at high speed due to the simplicity of the operations thereby enabling an allocation attempt (or for that matter a completed allocation) to be completed within the span of a millisecond or less. In addition, the system: requires only a modest amount of memory storage; provides collision detection regardless of the number of other robots already "installed" in the world map as well as any arbitrary number of fixed obstacles; and the calculation time is independent of the number of robots or fixed obstacles within the world map, the calculation time being dependent only upon the "fineness" of the map grid (i.e. how many "dots" are required to represent the work envelope) and the area swept out by the proposed moves.

OBJECTS OF THE INVENTION

It is, therefore, one object of the present invention to provide a novel method and apparatus for collision detection in a multi-robot system.

Still another object of the present invention is to provide a novel method and apparatus for collision detection in a multiple robot system and which employs a graphical approach for determining a potential collision.

Still another object of the present invention is to provide method and apparatus for collision detection in a multiple robot system in which maps are constructed for each arm in the system and for the "world" of all robots and fixed obstacles and wherein the maps are combined in a unique and yet highly simplified manner for detecting a collision.

Still another object of the present invention is to provide a novel method and apparatus for collision detection in a multiple robot system in which maps of the robots and the world are uniquely combined in such a manner as to automatically allocate movement requested by a robot as part of the collision detection operation.

Still another object of the present invention is to provide a novel collision detection method and apparatus for use in a multiple robot system in which maps of the robot and the world are combined employing predetermined logical operations for collision detection, allocation and deallocation of a robot path.

Still another object of the present invention is to provide a novel method and apparatus for collision detection in a multiple robot system in which attempts to obtain an alternate path are utilized in the event of a collision condition resulting from a previously requested path of movement.

DESCRIPTION OF THE FIGURES

FIG. 1a shows a simplified block diagram of the computer-based control for the system of FIG. 1;

FIG. 2 shows a grid useful in describing the work envelope employed in the apparatus and method of the present invention;

FIG. 3 shows the structure of a computer word employed in the method and apparatus of the present invention;

FIG. 6 shows a portion of a map showing the manner in which a "swept out" area of a robot body is represented;

FIGS. 8a and 8b respectively show a logic table and schematic diagram useful in explaining the logical "exclusive-OR" operation utilized in the collision detection method and apparatus of the present invention;

FIGS. 9a and 9b respectively show a logic table and a schematic diagrams which are useful in describing the logical "inclusive-OR" operation employed in the collision detection method and apparatus of the present invention;

FIGS. 11a through 11h show flow diagrams for various operations of the system of the present invention for performing detection and recovery operations.

DETAILED DESCRIPTION OF THE INVENTION

Figure 1:
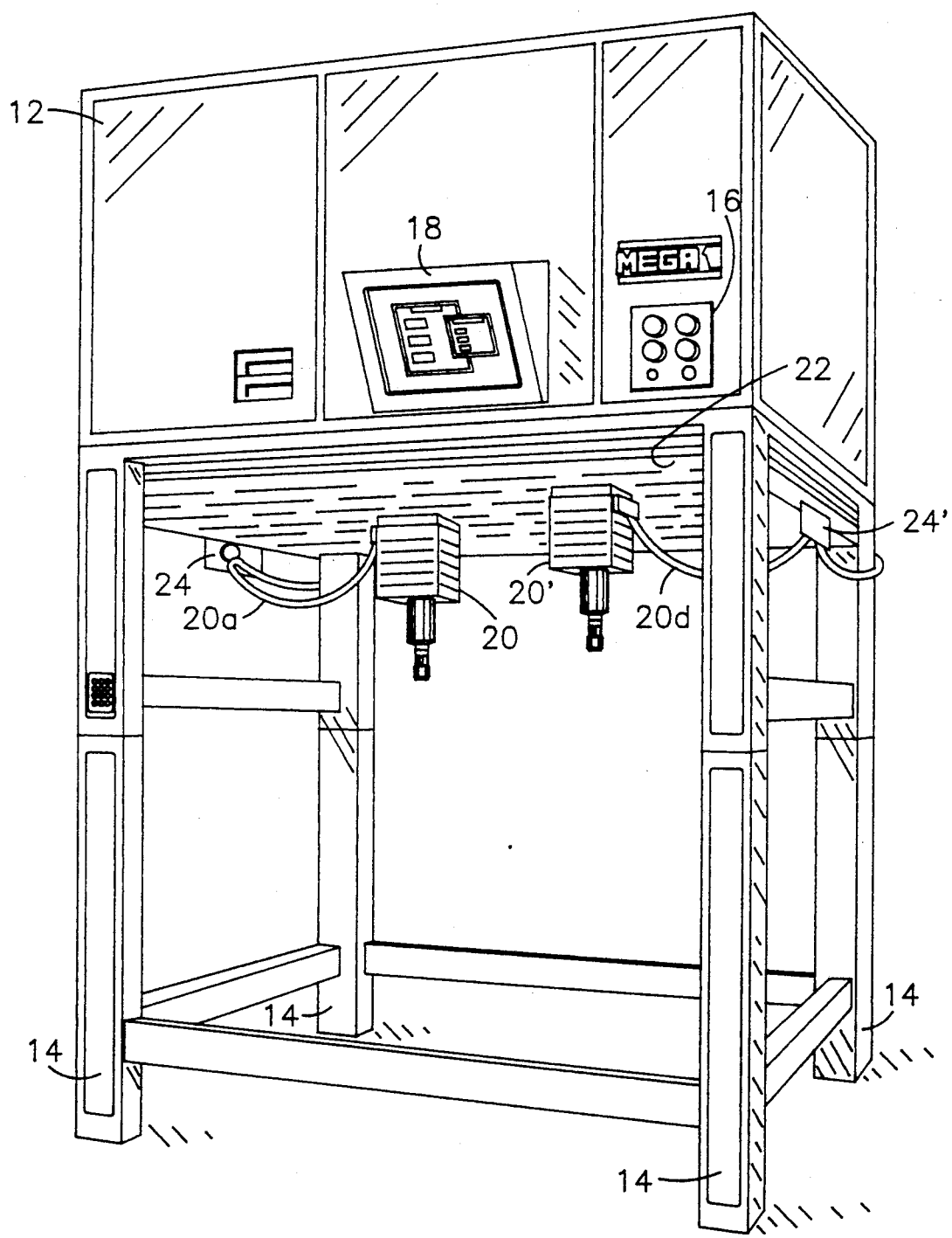
FIG. 1 shows a perspective view of a multiple robot system employing the novel collision detection method and apparatus of the present invention.

FIG. 1 shows a multiple robot system 10 embodying the collision-detect principles of the present invention and comprised of a housing 12 mounted upon supports 14. Housing 12 comprises the control cabinet for the electronic control, some of which is shown in FIG. 1a. A plurality of operating buttons 16, as well as a touch-screen 18, also employed for control purposes as well as for display, are arranged so as to be accessed from the exterior of the control cabinet 12.

The system 10 is of the overhead system type in which a conveyor (not shown) or other form of work surface may extend through or be moved through the open region defined by the uprights so as to align workpieces on the work surface beneath the robots 20, 20'. Although only two robot arms are shown, a greater number may be used in system 10. The robots are each connected to the control by an umbilical cord 20a, 20a'. The robots are powered by electro-magnets contained within the robot housings and are attracted to an upper plate 22, referred to as a platen by permanent magnets and slide along the platen on a layer of compressed air. Power in the form of electricity and compressed air is transmitted to each robot from the electronic system and control cabinet 12 by the umbilical cords 20a, 20a' attached to the machine's frame as shown at 24, 24'. The robots include xy forcers capable of moving the robot in mutually perpendicular directions along the overhead platen 22 and may be of the type described in copending Application Ser. No. 112,534, filed Oct. 26, 1987 now U.S. Pat. No. 4,890,241, issued Dec. 26, 1989 and assigned to the assignee of the present application, said patent being incorporated herein by reference thereto.

FIG. 1a shows a block diagram of the control system for operating the robotic devices providing, among other functions, controlling motions, determining colliding or non-colliding paths, allocating resources, communicating with external devices and the like. The system utilizes a multiple computer bus 32 employing a signal protocol allowing multiple computers to share peripherals and to communicate with each other by way of the bus. Bus 32 is preferably a VME bus which is an international standard computer bus architecture for use with multiple computers. The architecture of the VME bus provides a "system controller" which arbitrates contentions for the bus when multiple computers share bus resources. Computer 34 which preferably includes support chips such as floating point processors, performs computations in real-time and is preferably a 32 bit device capable of running at clock rates in the range of from 10 to 25 megahertz. Computer 34 may, for example, be a Motorola-type 68020 cooperating with a Motorola 68881 floating point processor. The VME bus 32 links computer 34 to the plurality of CPUs 36, 36', etc. (only two such CPUs being shown for purposes of simplicity).

The hardware for implementing a multiple computer environment may be comprised of Heurikon-type HK68-V2F or HK68-V20 devices, each of which incorporates a 68020 MPU, a 68881 floating point processor and the VME bus.

Memory 38 is coupled to the 68020 MPU and preferably utilizes a real-time multi-tasking operating system kernel such as a VRTX (from Hunter & Ready, Inc.), for servicing MPU 34 with data stored in the memory which may include: the data base of the system, the operating system, a user program, and the user's logical teaching which incorporates all of the data necessary to describe resources, compounds and jobs, for example. MPU 34 is further coupled to sensors providing data identifying the instantaneous positions of the robot devices 20, 20', etc., as well as the states of the I/O devices which may be associated with each robot, which state is also necessary in the performance of monitoring and control functions. MPU 34 is also coupled to the I/O devices to select the proper I/O and control their operation (i.e. on/off).

As was described hereinabove, the robots 20, 20' (as well as other robots which may be employed in the system) may be moved to any position along the surface of the platen 22 thus creating the possibility of collisions. Due to the unique design of the present invention, "collisions" need only be considered in the xy plane, i.e. the plane of platen 22, due to the fact that the robots 20, 20' are substantially rectangular parallelipiped solids having a relatively small "footprint" and moving along platen 22 so that any 3-D collision with another robot is predictable from a 2-D (xy) projection onto platen 22. Furthermore, any collision with a fixed obstacle can usually be considered as a 2-D projection, with the obstacle's height considered separately. Thus, the general 3-D collision problem may be broken into two smaller problems, namely the 2-D collision projected onto platen 22 and the 1-D height collision. In many cases, the "height collision" provides no new information beyond the 2-D result and its calculations can be entirely omitted.

The anti-collision problem, according to the present invention, is broken down into a collision-detect phase and a recovery (evasive-action) phase. During the collision detect phase, the collision-detect problem is decomposed into the 2-D xy detection and the 1-D comparison. In the event that no collision is detected for a given proposed move, the move is allowed. If an impending collision is detected, "evasive action" is taken which action ranges from simply waiting for the needed space to free up to making attempted moves around the block space, the "attempted" move also being checked for possible collision.

Although the collision-detect phase is the most time-consuming part of the approach, the present invention utilizes a highly efficient "detect" algorithm enabling many "evasive actions" to be considered and tested for collision on a real-time basis.

The algorithm of the present invention utilized for collision detection (which also includes "cord-detangling" as a special "collision" case) is a graphical approach in which "maps" are constructed for each robot arm in the system and for the "world" of all robots and fixed obstacles. Each map represents a two dimensional projection of the work envelope of the work station, i.e. the maps are the work envelope of the work station as seen, for example, from the surface of platen 22. Each map is composed of a grid of "dots", each dot representing a small quantized square of the platen surface, the dots, taken together, representing the entire platen surface. According to the present invention, an "off" dot in the map represents free space and an "on" dot represents the presence of material which may, for example, be the "projected" robot body or its umbilical cord or any stationary object such as a parts feeder. To make a "move", the area swept out by the robot body and its umbilical cord is drawn on its robot map as an appropriate series of dots. An attempt is then made to "install" the robot map in the "world" map by moving all of the "on" dots from the robot map into the world map on a byte-by-byte basis. If any robot map "on" dot is installed on top of a world map "on" dot, a (potential) collision is signalled. The proposed move is cancelled by "erasing" the portion of the swept area entered into the world map up to the point at which a collision is detected and evasive action is then taken. Thereafter, the robot and world maps are each returned to their original state. However, if all robot map dots are successfully transferred to the world map, the move is deemed to be "non-colliding". The presence of the robot map "dots" in the world map "allocate" the space needed for performing a non-colliding movement. Thus, if any other robot move attempts to intrude in the allocated space, it will be detected during the dot installation process.

When a move is completed, the allocated space in the world map must be deallocated, which operation is efficiently performed by using the robot map. All "on" dots in the robot map are used to turn "OFF" their corresponding dot in the world map. The robot is then drawn in its "rest" position in the robot map and the "rest" image is installed in the world map. Thereafter, anti-collision calculations can now proceed for any of the other robots or for a subsequent operation to be performed by the robot which is completing an operation.

It is important to note that the collision detection works correctly regardless of the number of other robots that are already "installed" in the world map and works for any combination of moving and stationary robots. In fact, the approach also works in the presence of an arbitrary number of fixed obstacles, represented as a series of permanently installed "on" dots on the world map, which result arises from the fact that the algorithm protects collisions of a proposed robot move with anything that is presently in the world. By comparison, algorithms of conventional systems methodically check the path of a given robot, in turn, with each other object in the world whereas the algorithm of the present invention recognizes that it is often not important to determine what the robot is colliding with, but rather it is sufficient to determine the fact of a non-free space in which to engage in a proposed move. The algorithm of the present invention has a calculation time which is independent of the number of robots or fixed obstacles and depends only upon the "fineness" of the map grid (i.e. how many "dots" are utilized to represent the work envelope and the area swept out by the proposed moves).

The algorithm of the present invention recognizes that it is often not important to determine what the robot is colliding with, but merely to determine the fact of a non-free space in which to make the proposed move. This reduced requirement enables the employment of graphical techniques yielding "yes/no" type results although typically providing no specific information about what the robot arm is colliding with.

The graphical technique of the present invention involves construction of "xy" work envelope maps which represent the projection of the two-dimensional work envelope onto platen 22 of the work station.

FIG. 2 shows the projection of the work envelope overlayed with a quantizing grid. In the example given, the grid is taken to be a 64×64 grid for representing a 64 inch by 64 inch work area, which implies that each grid square represents one square inch. For the computer implementation, each grid square represents a single bit in a computer word or "byte". Since many present day computers often use 32 bit words, the entire grid (or collision map) in the example of FIG. 2 can be efficiently represented by 128 computer words, each of which has a 32 bit length. A finer grid simply means that more computer memory is required to store the entire work envelope, but finer areas (i.e. less than one square inch size) can be utilized, if desired. Areas of 0.125" have been employed in the present invention. The area represented by a grid square is the MINIMUM SEPARATION AREA between a robot and any other robot or fixed obstacle. The locations of objects in space can be represented as a series of "on" and "off" bits in the map, as will be set forth hereinbelow.

The collision-detect algorithms use one work envelope map for each robot and a separate map for the "world". The map for robot 20, for example, is initialized to contain only the location of the body of robot 20 and its umbilical cord 20a. Similarly, the map for robot 20' contains only that spatial information representing robot 20' and cord 20a'. In a similar manner, maps for additional robots will contain only spatial information for that particular robot (and cord).

The "world map" represents and contains all of the objects under consideration for anti-collision, namely, all robot bodies, all umbilical cords, and all fixed obstacles, such as parts feeders and the like.

In practice, it has been found that about 8,000 (8k) bytes of computer storage are satisfactory to store a typical map. Thus, for a four-robot system, approximately 40k bytes of memory are required which requirement is easily met using presently available processors such as the Motorola 68020 shown, for example, in the system block diagram of FIG. 1a.

As was described hereinabove, the xy work envelope is divided into a quantized grid in the collision maps. In order to represent the grids in the digital computer, each grid square is taken to be a single bit in a computer word. For a 32 bit computer, i.e. for a computer capable of handling bytes of 32 bit length, such as the Motorola 68020, the first 32 squares, beginning with column 1, are stored as one word (or "byte"), the next 32 squares of row one, beginning with column 33, are stored as the next word in memory, and so forth. The same pattern holds for row two, row three, etc.

If the entire square that a given bit represents contains only EMPTY SPACE, its "representing bit" is set to ZERO. If any material, such as a part of a robot body, is found in or "touches" any part of the corresponding grid square, no matter how small a part being occupied or "touched", the "representing bit" is set to ONE. For example, assuming each bit is one square inch, the computer word shown in FIG. 3 represents "material" in the first six square inches of the upper left-hand corner of a collision map which area represents a length of six inches and a width of one inch, whereas, the rest of the row is comprised of empty space.

Figure 4:
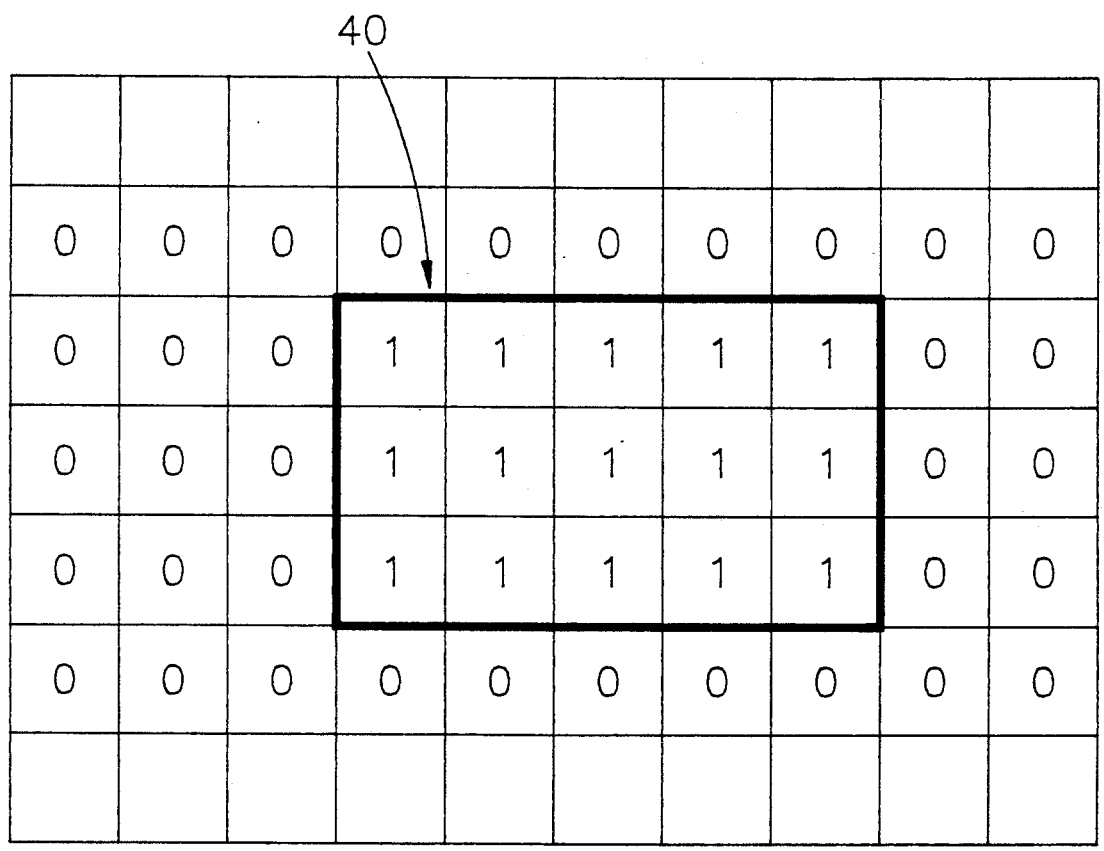
FIG. 4 shows a portion of a collision map showing the manner in which a robot body is represented.

A robot body is represented by its xy projection onto platen surface 22 which represents the ceiling of the work station. Considering the system of FIG. 1, which employs rectangular, Cartesian robots, each robot body is represented by a rectangular series of "ones" in the robot map and the world collision map as shown in FIG. 4 wherein the region 40 defined by the thick black line substantially represents the outline or periphery of the robot, each of the squares contained within the region 40 being in the "one" state.

Figure 11C:
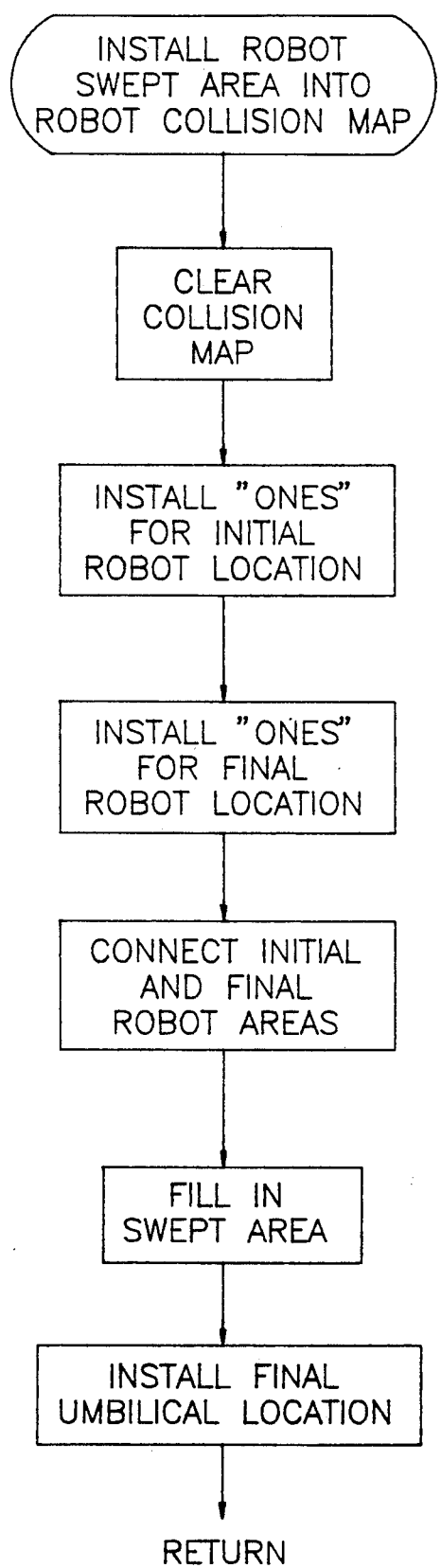
Figure 11F:
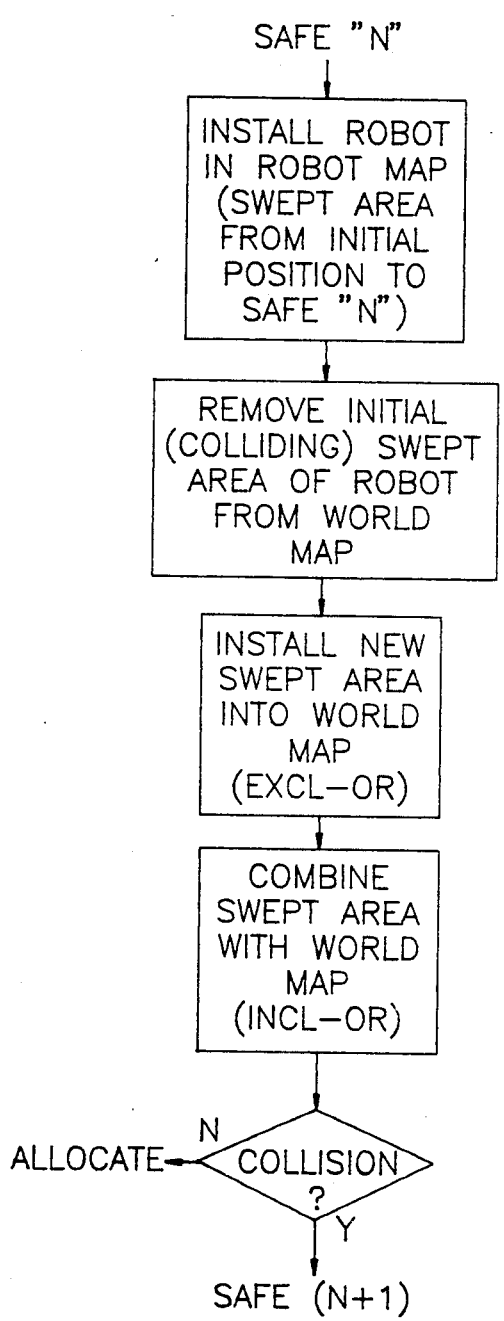

The initial location of the stationary robot body represented by region 40, is "drawn" in its appropriate robot collision map at the precise location it occupies and is further drawn in the world collision map which serves to initialize all of these maps for subsequent collision detection operations. See FIG. 11a.

Figure 5:
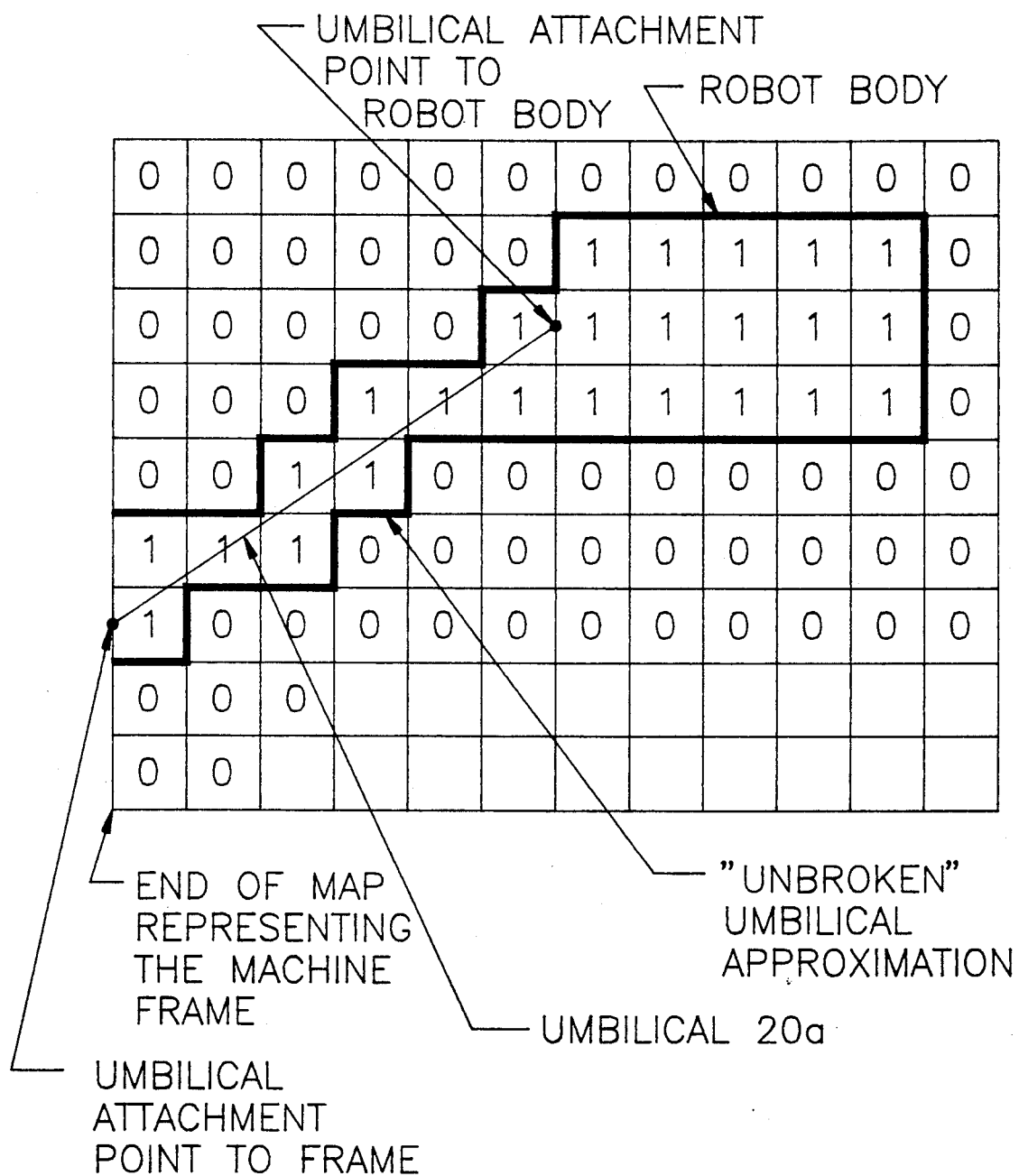
FIG. 5 shows a portion of a collision map showing the manner in which a robot body and its umbilical are represented thereon.

A robot umbilical cord such as the cords 20a and 20a' shown in FIG. 1, is represented by its xy projection on the surface of platen 22 which representation consists of a linear series of "ones" in both the robot and world collision maps. The "ones" begin at the attachment of 24 (or 24') of the umbilical cord to the frame of the system and continue in the best unbroken straight line approximation, terminating at the attachment point on the robot body. The term "unbroken" in the context of the present invention, means that any "on" bit representing the umbilical must have at least one of its eight "neighboring" bits also in the "on" state. A "neighbor" is one of the three top, three bottom or two side bits that surround the given bit in the map. This requirement insures correct determination of cord detangling during the collision-detect calculation. Note FIG. 5 which shows those squares occupied by a binary "one" as representing the robot body and its umbilical cord extending from the machine frame to the robot body. Umbilical cord 20a is shown as an unbroken diagonal line in FIG. 5. It should be noted that any square in which any portion of the umbilical cord passes through or "touches" is maintained in the "one" state.

The initial location of the stationary robot umbilical cord is "drawn" in its appropriate robot collision map as well as the world collision map thus serving to initialize the maps for the subsequent collision-detect calculations.

Fixed obstacles are simply represented by their xy projection on the surface of platen 22. Any grid square containing the "material" is set to "one", while empty space is set to "zero". The pattern of "ones" and "zeros" is entirely derived from the shape of the obstacle which may be any arbitrary shape, and does not alter the effectiveness of the present invention.

Unlike the robot body and the umbilical cord, fixed obstacles are only "drawn" in the world collision map and need not be drawn in the robot map. To "remove" a fixed obstacle, the "ones" representing the "material" of the fixed obstacle in the work surface are reset to "zero" in the world map (only).

In order to allocate space for a proposed move, it is necessary to calculate the "swept areas". Before any moves are made, all collision maps are initialized. Robot maps contain the "image" of the robot body and the umbilical cord for the given robot, which are drawn in the correct location in the work envelope. The world map contains the image of all robots, umbilicals and fixed obstacles.

The steps involved in determining a potential collision during the robot move will now be considered. See FIG. 11c.

Without loss of generality, we consider a move by robot 20 from the xy coordinates of (0,0) to the coordinates (3,5). The "location" of the robot is taken to be the location of the center of its robot body. For the example given, it is assumed that the robot body is five inches long and three inches wide and that each grid "dot" represents a one square inch area as shown, for example, in FIG. 6.

Figure 6:
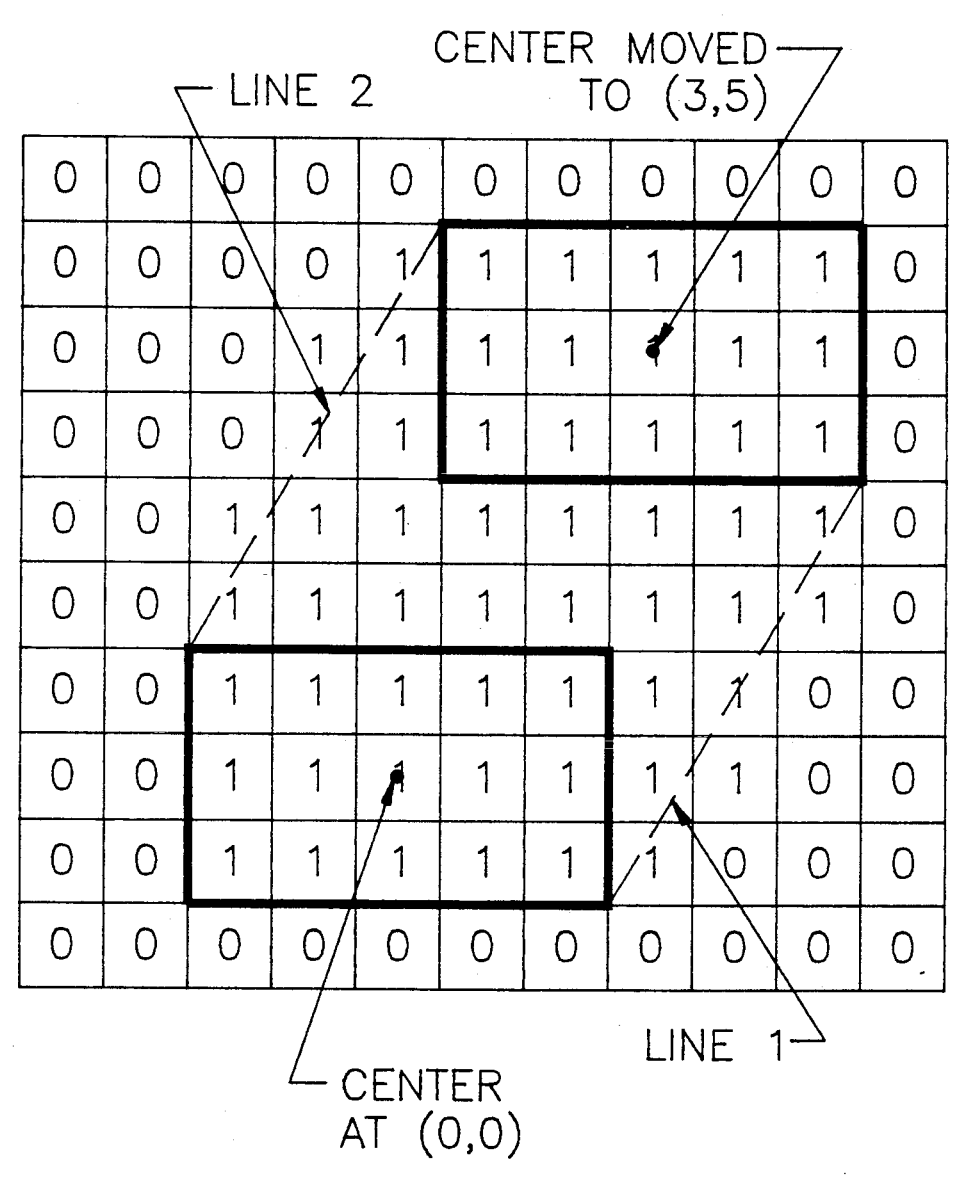

In order to move the robot, the area swept out by the robot body is first determined. Line 1 and Line 2 as shown in FIG. 6, are constructed, Line 1 running from the lower right of the robot body at the (0,0) coordinate to the lower right of the robot body at the coordinate (3,5). Line 2 runs from the upper left of the robot body located at coordinate (0,0) to the upper left of the robot body at coordinate (3,5). All grid squares touched by Lines 1 or 2 are set to "one", as is the area enclosed by Lines 1, 2, as well as the robot bodies in their initial and final position. The operations for computing the Lines 1 and 2 is straightforward and will be omitted herein for purposes of simplicity, one technique capable of being employed for this purpose being described in the aforementioned copending Application Ser. No. 112,534 now U.S. Pat. No. 4,890,241, issued Dec. 26, 1989.

The region occupied by the beginning and end robot positions and regions swept by the robot in moving between these two positions cause any square which the swept area overlies to be converted to a "one".

Figure 7:
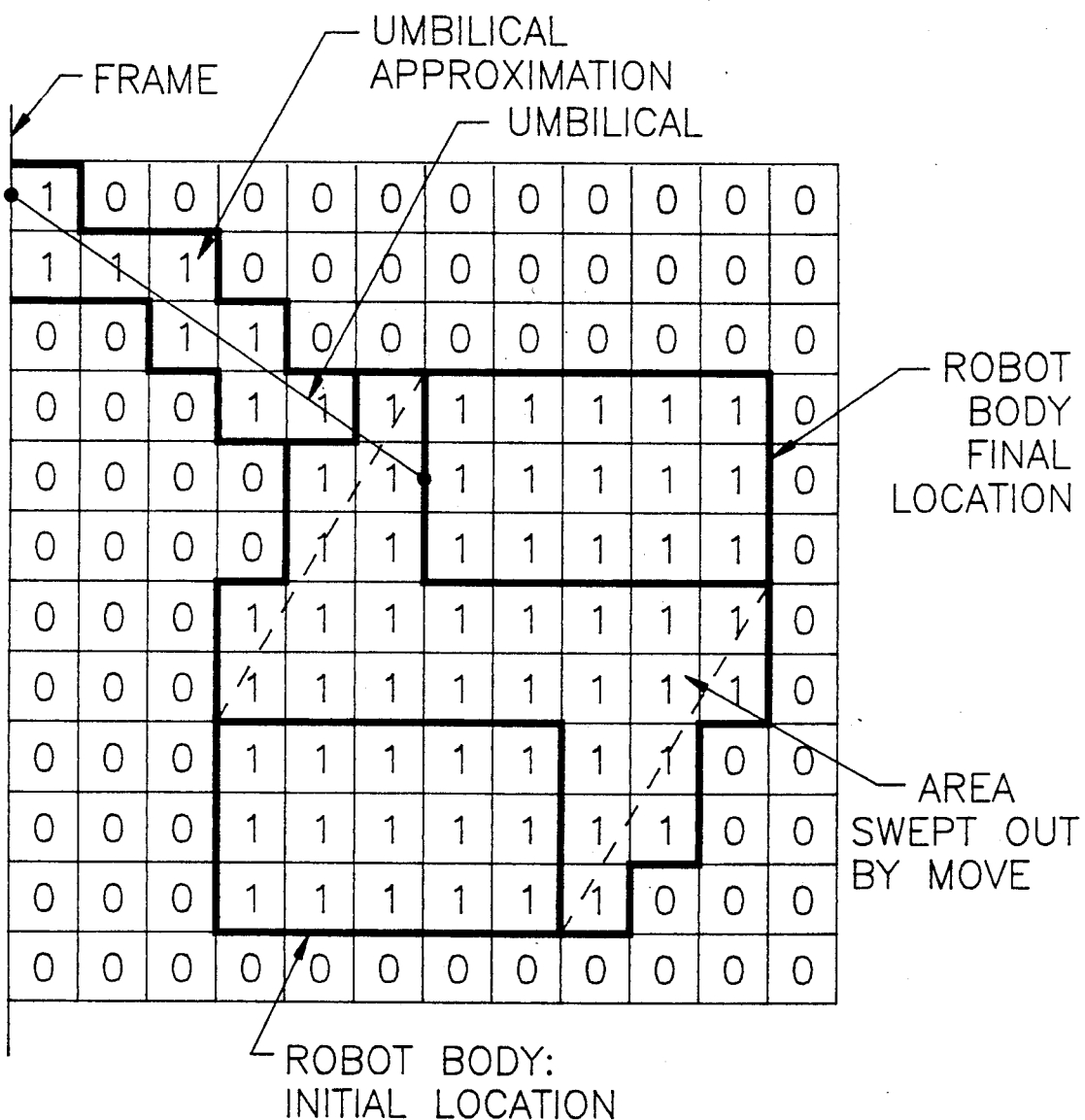
FIG. 7 is a collision map showing the manner in which the movement of a robot from a start to a finish position is represented.

After constructing the area swept out by the robot body movement on the robot map, the effect of the umbilical cord must now be considered. One approach is to draw the entire area enclosed by the umbilical cord as it moves from the initial to the final position. However, since the umbilical cord is flexible in practice (unlike robot bodies which are solid), it is often unnecessary to include the entire area swept by the umbilical cord. It is found to be sufficient to draw the umbilical cord as it appears in the final position only, ignoring the swept area as the umbilical cord moves. Thus the map, as shown in FIG. 7, will be used to represent the area that is swept out as robot 20 makes its move and also represents the final position of the umbilical cord.

Next, the robot map is prepared for the move by first erasing the old robot position which can simply be done by clearing the map to all "zeros".

To install the correct dots on the robot map, routines are written to turn on all bits from the initial to the final robot position, and all the enclosed area therebetween. The step involves only the straightforward construction of lines and will not be discussed in detail for purposes of simplicity, reference being made to the description set forth in copending application Ser. No. 112,534 now U.S. Pat. No. 4,890,241, issued Dec. 26, 1989. Finally, the umbilical cord is drawn as it would appear in the final position, assuming a successful move from the initial to the final position.

The installation into the robot map involves no comparisons and is straightforward. The next step, the installation of the image in the world map, involves the critical comparisons that form the collision-detection operation. See FIG. 11b.

Figure 11E:
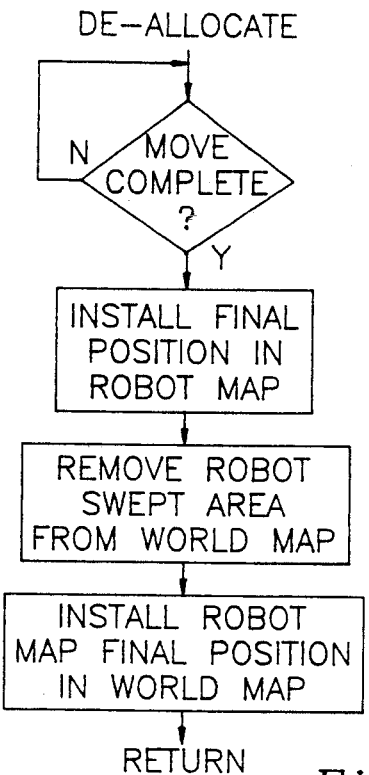
Figure 11D:
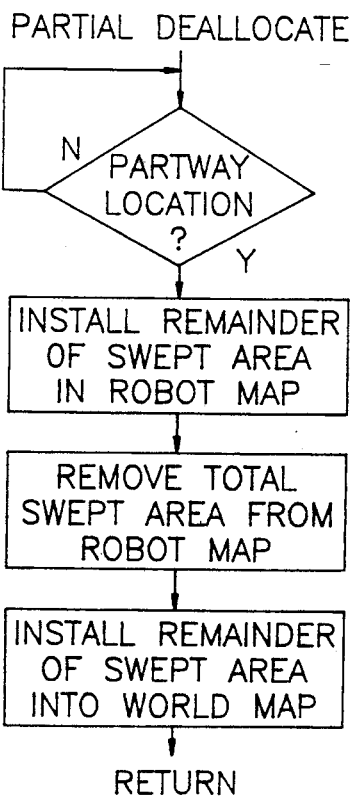

First considering the case of a potential collision, when a robot move is proposed, the "initialized" image of the robot is first selectively erased from the world collision map. The term "selectively" is used because the other data in the world map, namely the other robots and fixed obstacles, must not be erased. See FIG. 11d.

An extremely efficient method which may be utilized to selectively erase the world map, given the way that the present system has selected to represent data comprises the use of a bit-wise logical operation referred to as a logical "exclusive-OR" which is shown in FIG. 8 and which is a built-in instruction in modern processors such as, for example, the Motorola 68020. This logical binary operation between two operands causes the output bit to be cleared to "zero" if both input bits are "zero", or if both input bits are "one". The only way the output bit is set to "one" is if only one of the input bits is set to "one". The "exclusive-OR" logical operation is in contrast to the "inclusive-OR" logical operation in which an output bit is set to "one" if either (or both) of its input bits are "one" as is shown by the representation of FIG. 9a.

Recalling that, as an initial condition, a robot map contains only its given robot body and umbilical corq, whereas the world map contains all robots and fixed obstacles, by taking the "exclusive-OR" of a robot map with the world, the robot image in the world is selectively erased, 32 bits (i.e. one byte) at a time when using a 32 bit processor. To better understand this operation, it should be recalled that all "zeros" in the robot map (representing "empty space") will not change their corresponding position in the world map. This is true since the "exclusive-OR" of the "zero" with a "B" bit (where "B" may equal either "one" or "zero") is the unchanged value "B". Furthermore, all "ones" in the robot map (representing part of the robot body or umbilical cord) will cause the corresponding bit in the world map to be cleared to "zero". This is true since the corresponding world map bit starts out as "one", and the logical "exclusive-OR" operation of "one" and "one" is "zero".

As was mentioned hereinabove, the clearing is performed by combining the 32 bit bytes of the robot map with the associated 32 bit bytes of the world map on a byte-by-byte basis, the typical operation being one in which each associated bit of the 32 bit bytes are combined by the logical "exclusive-OR" operation with the bits being combined in a successive or sequential fashion. Upon completion of the combining of associated bits of the associated bytes, the next associated bytes of the robot and world map are extracted from memory and combined in a similar fashion, i.e. sequentially by bit and sequentially by byte, until all of the bytes for the entire work space have been so combined.

After the desired robot has been selectively erased from the world map, the robot map is cleared (either by setting all squares to "zero" directly, or by "exclusive-ORing" the robot map with itself which will accomplish the same result. The area swept out by the move is calculated and installed in the robot map as was described hereinabove. This area has more "material" than a stationary robot, due to the consideration of the total area swept out by the move.

Figure 10:
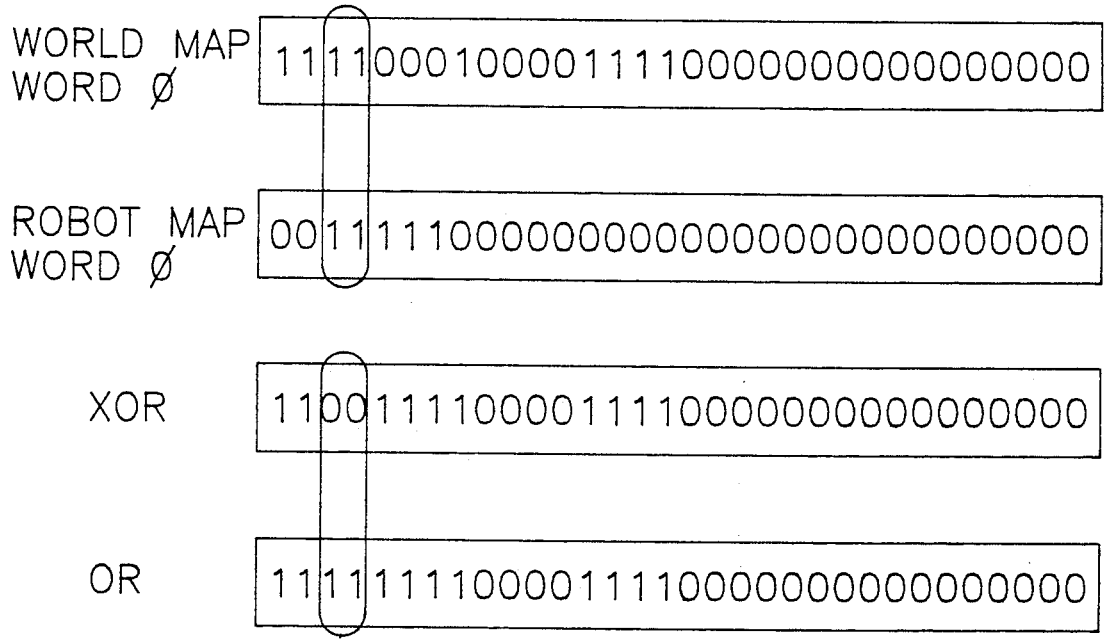
FIG. 10 shows predetermined bits of "slices" of a world map and a robot map which have been combined employing the logical operations shown in FIGS. 8a and 9a and which is useful in describing the detection of a collision.

The next step comprises installing the robot map into the world map in a byte-by-byte fashion, which actually performs the collision-detection program as well as automatically providing for the allocation. The robot map is installed in the world map according to the following procedure (see FIG. 11c):

The first word, which is a 32 bit byte of the robot map is "Exclusive-ORed" with the corresponding (first) word in the world map and the result is saved in "XOR". As can be seen from FIG. 10, the result produces a word in which a bit will be "one" if there was a "one" in the robot word, or the world word, but not if there was a "one" in both map positions at the same time. A "one" in the same bit positions in both maps represents the case in which there is material in the world colliding with the needed space for the robot to move. In order to detect that this event has occurred, the first word (i.e. byte) in the robot map is next "Inclusive-Ored" with the corresponding (first) word in the world map and the result is saved in "OR". FIG. 10 reveals that the result contains a "one" in all bit positions that are "one" in either the robot or world map, including the "collision bits". An equality test is now performed between the words saved in the "XOR" and the "OR", in order to detect the collision condition. If the "XOR" and the "OR" words are equal, this indicates that there is no collision in that strip of work space represented by the map world being examined. In this case, the result ("XOR" or "OR") is saved and is installed in the world map as the new map word. If the "XOR" and "OR" words are not equal, this is an indication that an impending collision has been detected for the strip under test. The "XOR/OR" test is repeated for each word in the robot map. Actually any "ALL-ZERO" word in the robot map can be skipped since it could not possibly cause the collision regardless of the word of the robot map with which it is being compared. "All zero" bytes are automatically tested and identified by the Motorola 68020 processor by setting a flag bit. By examining the flag bit the byte may be skipped when it is all zeros thereby greatly reducing processing time. Once a comparison test indicates an impending collision, the comparison test is halted and the proposed move is declared to be "in collision".

It should be noted that the method described hereinabove does not distinguish among collisions between robots, umbilical cords, and fixed obstacles. All that matters is that a space needed for the proposed move is unavailable in the world. The precise reason for the collision (robot, umbilical cord, obstacle) is unimportant and as a result, this very fast algorithm is thus used to determine the fact of a collision, even though the reason for the collision has not been determined.

It should further be noted that the time to perform the calculations is independent of the number of "ones" in the world map and is, therefore, independent of the number of obstacles or robots in the world map. The calculation time depends only on the "fineness" or resolution of the grid (a finer grid requires more memory and thus more calculations to do a complete check), and also on the size of a proposed move (since a move over a larger distance, for example, will have more non-zero entries in the robot map that must be checked).

When an impending collision is determined, the maps must be restored to their original state. The partial image of the proposed move is selectively erased from the world map by performing an "exclusive-OR" operation on all words (i.e. bytes) already installed in the world map (until the first "collision" was detected). The robot map is then cleared, the present stationary location of the robot is drawn in the robot map and then redrawn into the world map (usually by an "ORing" operation). The maps are now ready for additional collision-detect operations, and the user knows the proposed move is disallowed.

Each byte in which there is "no collision" is entered into the world map. If the comparison of all of the words detect a "no collision" condition, in which the XOR and OR words are compared in the same manner as described hereinabove, the proposed move is considered safe.

It should be noted that the very act of installing the robot map into the world map correctly updates the world map for any subsequent collision-detect test performed while robot 20 (for example) is in motion. That is, during the movement of robot 20, the entire area swept out by the move is properly "allocated" in the world map. Assuming that robot 20' proposes a move, the area swept out by robot 20' in moving to its desired objective must not collide with any of the stationary robots, fixed obstacles or the sweep area over which robot 20 is moving. The world map properly takes this into account. The result may be slightly pessimistic in that robot 20 may have already passed the point on its trajectory that would interfere with the movement of robot 20'. However, the collision-detect will never fail to detect a possible collision. Additionally, since robot moves are typically of short duration (under one second) waiting for a move to be completed is not usually a terrible burden. Finally, the move can be examined "in flight" and space can be deallocated as a robot is moving if maximum performance is either desired or required.

To deallocate space after a completed move, the robot and world maps containing the entire area swept out by the move must be deallocated, either during or at the completion of a move. See FIG. 11e.

To deallocate a move space when a move has been completed, the world map is selectively erased by "exclusive-ORing" the "allocated space" robot map into the world map. Thereafter, the robot map is cleared to zero and the final position of the robot body and its umbilical cord are drawn into the robot map and thereafter "ORed" into the world map. The maps are now ready for additional collision-detect calculations.

When a move is determined to produce no collision (and, therefore, is allowed), the robot and world maps contain the entire area swept out by the move during the move. When a move is partially completed, but still in progress, the space no longer needed for the move can be deallocated, thereby freeing up part of the work envelope sooner than would be required for the next request to wait for a fully completed move. With the speed of present day computers, such as the Motorola 68020, the move can be partially deallocated at least one time during the move as well as at the end of the move.

To partially deallocate a move space, "exclusive-ORing" the "allocated" space robot map into the world map. See FIG. 11d. The robot map is then cleared to zero. The present position of the robot (which is still "in flight") is utilized to draw the robot body into the robot map, along with the area swept out by the remainder of the move, and the final position of the umbilical cord. This image is directly "ORed" into the world map with no additional checks. Since the entire move was originally non-colliding, the remainder of the move must also be non-colliding. The maps are now ready for additional collision-detect calculations. The algorithm now determines, using the collision-detect mathematics described hereinabove, whether or not any other robots can now move now that part of the work space, i.e. the part of the sweep area which has been deallocated.

When a proposed move from point A to point B is detected to be "in collision", the move is not allowed to take place. The anti-collision algorithm then undertakes what is referred to as "collision recovery".

The simplest recovery is the "stationary recovery". Since it is always safe to remain at rest, i.e. "not move", the algorithm simply has the offending robot remain stationary for a predetermined short time interval (typically less than one second). As each of the other robots complete their moves, all robots are examined for being in a pending state of "stationary recovery". Presumably, as the other robots move, a space will eventually open up for the offending robot. As soon as a free space exists for moving from point A to point B, the move is allowed. The determination that the space is available is made by performing another collision-detect sequence, with the new, updated world map.

The system may employ a more complicated recovery sequence than the "stationary recovery" technique. See FIG. 11h. The robot whose move is "in collision" is permitted to try other evasive moves in order to get around the blockage of the move from point A to point B.

Typical of such recovery moves is the "move to a safe point". The algorithm is set so that if a move from point A to point B is disallowed an attempt will next be made to move to a point called "safe". The move from point A to the "safe" point is checked for collisions using the collision-detect algorithm. If the safe move is allowed, the move is performed. If the safe move is disallowed, another "safe" move (to safe 2) can be attempted or the robot can then remain stationary. The prioritized sequence of attempted moves forms a "collision-recovery-table", which is stored as part of the algorithm. At the end of each recovery move, the original move to point B is attempted. If allowed, the move to point B is made and normal operation resumes. If disallowed, the sequence of actions, as dictated by the recovery table, is followed. If the table entries become exhaustive, the robot is forced into stationary recovery.

Figure 11G:
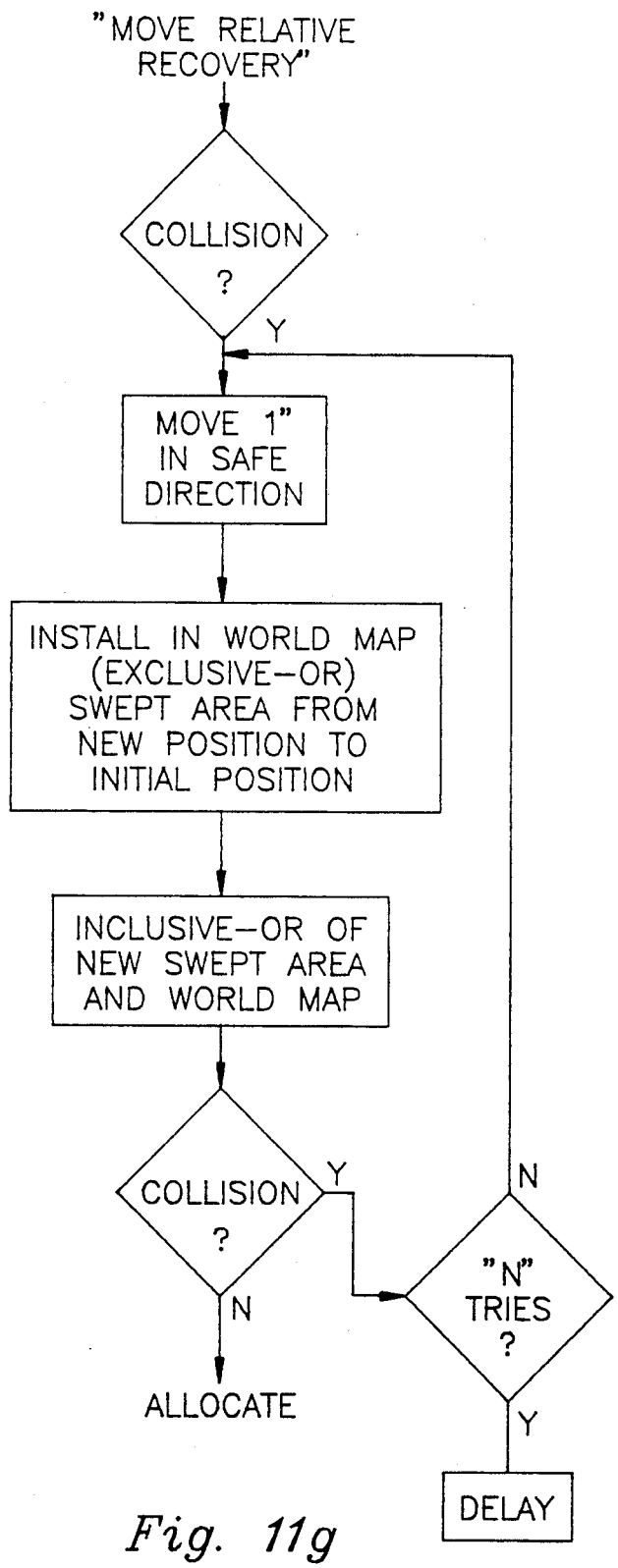
Figure 11H:
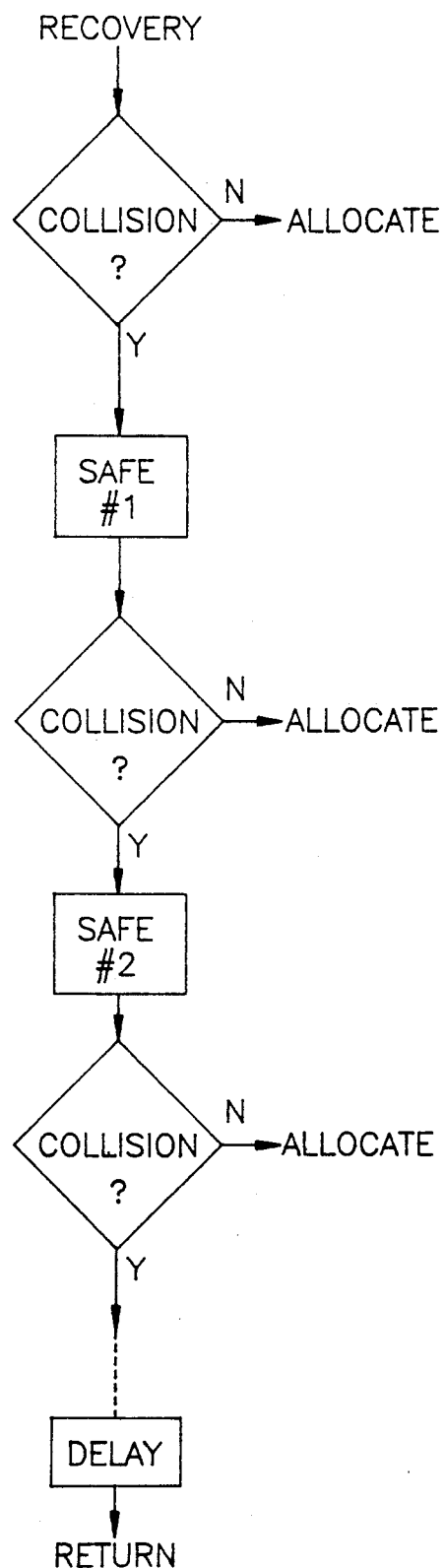

Another typical recovery move is the "move relative" recovery (see FIG. 11g). Using this approach, the robot is moved in a specified direction from where it is now. For example, assuming the left side of the work space (toward x=zero) is known to be free of obstacles. It might be reasonable to have the algorithm move robot 20, for example, in small increments such as one inch toward the "x=zero" location. At the termination of each move of one inch, the collision situation is reevaluated. If a non-colliding situation is uncovered, the robot can move to its original target. If a "maximum number" of "incremental moves" has been exhausted, this action is considered to have failed and the next entry in the collision-recovery-table is attempted. Specifying a "maximum number of retries" when using the "move relative" recovery technique prevents the robot from being instructed to move beyond the boundaries of its work space.

Summarizing, the algorithm of the present invention provide an accurate and rapid means for anti-collision detection in a multiple robot system with fixed obstacles where all of the robots may be moving at substantially the same time. Breaking the anti-collision problem down to a collision-detect phase and a recovery (evasive-action) phase and by further breaking the 3-D collision-detect problem, conducted during the collision-detect phase, into a 2-D xy detection and a 1-D height comparison (which may be omitted in many cases) has led to simplicity of the system design and technique.

The collision detection system of the present invention not only works rapidly but correctly regardless of the number of robots that already "installed" into the world map and works for any combination of moving and stationary robots as well as working in the presence of an arbitrary number of fixed obstacles which are represented as permanently installed "on" bits within the world map. The system determines the possibility of collision during a single collision-detect phase, regardless of the number of "materials" (i.e. "obstacles") present in the world by focussing upon the fact of a non-free space as opposed to determining the specific object causing the collision. Calculation time of the present system is independent of the number of robots and/or fixed articles and depends solely on the "fineness" (i.e. resolution) of the map grids (i.e. number of "bits" required to represent the work envelope) and the area swept out by the proposed moves.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A collision detection met robot system having at least two robots movable about a common surface of a predetermined size
   (a) providing a world map and a plurality of robot maps each divided into an xy grid of uniform sized squares, each map being the same size as said common surface for receiving two-dimensional representations, of robots projected onto said common surface;
   (b) associating each of said squares of each maps with a predetermined memory cell in an associated memory;
   (c) installing the initial location of each robot in its associated map by setting each memory cell associated with a square in the associated robot map having at least a portion thereof occupied by said robot to a first binary state;
   (d) installing the initial location of each robot in the world map by combining the binary bit of each robot map memory cell with the binary bit of the associated memory cell of the world map;
   (e) removing the initial location of a predetermined robot from the world map by a logical combination of the memory cells of the robot map of said predetermined robot with the associated memory cells of the world map responsive to a move request for said predetermined robot;
   (f) installing the swept area representing movement from the initial position to a desired final position of said predetermined robot upon a swept area robot map by setting all of the memory cells occupied by the swept area to said predetermined state;
   combining the binary states of associated memory cells of said swept area robot map and said world map using a first type of logical OR operation;
   (h) combining the binary states of associated memory cells of said swept area map and said world map using a second type of logical OR operation different from said first type of logical OR operation;
   (i) indicating a collision if the binary states of any one of the associated memory cells of the logical combinations resulting from said first and second types of logical OR operations are unequal.

2. The method of claim 1 wherein said first type of logical OR operation is an exclusive-OR operation.

3. The method of claim 2 wherein said first type of logical OR operation is an inclusive-OR operation.

4. The method of claim 1 wherein said first type of logical OR operation is an inclusive-OR operation.

5. The method of claim 1 wherein steps (g) and (h) further comprise the step of sequentially combining groups of memory cells each having a predetermined number of memory cells and further comprising the step of installing the result of step (g) into the world map memory cells when the binary states of the combined groups resulting from steps (g) and (h) are equal.

6. The method of claim 1 wherein said first predetermined state is the binary "ONE" state.

7. The method of claim 1 further comprising the step of providing an allocation condition when all of the associated memory cells of the combined maps created in steps (g) and (h) are equal.

8. The method of claim 7 further including sequentially combining groups of memory cells each having a predetermined number of memory cells and further comprising the step of installing the result of step (g) into the world map memory cells when the binary states of the combined groups resulting from steps (g) and (h) are equal.

9. The method of claim 1 wherein the memory cells of each map are arranged in bytes each having a uniform number of memory cell "bits", each byte of each map being associated with a byte of every other map.

10. The method of claim 9 wherein steps (g) and (h) each further comprise the steps of:
    extracting associated bytes of the robot and world maps from their memory cells;

combining the associated bits of the extracted bytes in a sequential fashion.

11. The method of claim 10 further comprising the step of installing the result of step (g) into the memory cells of the world map when the results of steps (g) and (h) are equal.

12. The method of claim 11 wherein step (i) further comprises the steps of:
   (j) comparing associated bytes in fashion; and
   (k) halting the comparison when the associated bytes being compared are unequal.

13. The method of claim 12 further comprising the step of removing the binary data of those bytes installed into the memory cells of the world map previous the occurrence of the inequality condition occurring at step (k).

14. The method of claim 1 further comprising the steps of:
   (j) combining the binary states of the associated memory cells of the swept area robot map and the world map in a logical OR operation to erase the swept area from the world map;
   (k) installing the binary states representing the present position of the robot whose swept area has been removed from the world map into the memory cells of a robot map;
   (l) installing the robot map of the robot's present position by combining the binary states of the associated memory cells of the last-mentioned robot map and the world map.

15. The method of claim 14 wherein step (j) employs a logical exclusive-OR operation.

16. The method of claim 14 wherein step (k) employs a logical OR operation.

17. The method of claim 1 wherein step (c) further comprises the step of:
   installing two-dimensional representations of fixed objects in the work space into the world map by inserting said predetermined binary state in each memory cell associated with the squares containing any portion of the fixed objects.

18. The method of claim 1 further comprising the steps of:
   (j) removing the original swept area from the world map memory cells by reversing the binary state of the world map memory cells representing the swept area;
   (k) installing a swept area of a robot moving between its initial position and a safe position located between the initial position and the desired final position into the associated memory cells of a swept area map by inserting the predetermined binary state into those memory cells representing squares touched by the swept area;
   (l) repeating steps (g), (h) and (i) employing the world map and the swept area map created during step (k).

19. The method of claim 18 further comprising the steps of:
   repeating steps (j), (k) and (l) employing a swept area having a second safe position different from said first safe position and said desired final position responsive to a collision condition.

20. The method of claim 18 further comprising the steps of:
   repeating steps (j), (k) and (l) employing a swept area having a second incremental distance into said known safe region different from said first safe position and said desired final position responsive to a collision condition.

21. The method of claim 18 further comprising the steps of:
   preventing movement of the robot requesting the allocation for a predetermined delay responsive to a collision indication.

22. The method of claim 1 further comprising the steps of:
   (j) removing the original swept area from the world map memory cells;
   (k) installing a swept area of a robot moving between its initial position and a incremental position located a small predetermined distance away from said initial position into a known free space region of the common surface by inserting said predetermined binary states into those memory cells representing square a touched by said swept area; and
   (l) repeating steps (g), (h) and (i) employing the world map and the swept area map created during step (k).

23. The method of claim 22 further comprising the step of:
   preventing movement of the robot requesting the allocation for a predetermined delay responsive to a collision indication.

24. The method of claim 1 further comprising the step of:
   preventing movement of the robot requesting the allocation for a predetermined delay responsive to a collision indication.

25. The method of claim 24 wherein said delay period is about one (1) second.

26. The method of claim 1 wherein each robot is coupled to a controller by an umbilical cord, said method steps (c) through (h) further comprising the steps of:
   installing the two-dimensional representation of the umbilical cord into the robot maps and the world map and installing the two dimensional representation of the swept area of the umbilical cord into the swept area robot map.

27. The method of claim 1 wherein each robot is coupled to a controller by an umbilical cord, said method steps (c) through (f) further comprising the steps of:
   installing the two-dimensional representation of the desired final position of the umbilical cord into the swept area robot map.

28. A method for detecting collisions in a robot system in which at least two robots are movable to any position along a common surface comprising the steps of:
   (a) providing in a memory storing device a world map and a plurality of robot maps each being divided into an xy grid of uniform sized squares, each map being the same size as said common surface for receiving two-dimensional representations of robots and other objects projected onto said common surface, the memory storage device having a plurality of memory locations, each memory location being assigned to store the condition of an associated square of said world map and said robot maps;
   (b) installing a two-dimensional representation of a robot into an associated robot map representing the two-dimensional projection of the initial position of the robot upon the common surface by inserting a mark in those memory locations presenting squares in which at least a part of the robot is projected;

(c) combining each robot map with the world map by combining the data stored in the memory storage device world map and robot maps to install the robots into the world map;

(d) removing the robot of a robot map from said world map by removing the robot data from the world map data in the memory storage device responsive to a requested move for the robot which is being removed;

(e) creating a robot map in which the total swept area of the move is installed by inserting a mark in those memory device locations representing each square of the robot map touched by said swept area, said swept area representing the total area of movement of the robot from the initial position to a desired final position;

(f) combining stored data representing the swept area of the robot map with the world map by storing data in each square of the world map where whenever a mark is present in the corresponding square of either the world map or the robot map but not both; and (g) indicating a possible collision if any stored data representing corresponding squares in the world map and the swept area robot map both contain a mark.

29. The method of claim 28 further comprising the steps of:

(h) removing stored data from the memory storage means representing the marks from the world map representing the swept area of a robot responsive to a collision indication;

(i) creating a robot map according to step (e) for a swept area extending between the initial position and a desired final position different from the desired final position employed in step (e) when originally performed; and (j) combining data in the memory locations representing the swept area robot map created during step (i) with the world map.

30. The method of claim 28 further comprising the step of providing a non-collision indication when none of the locations representing associated squares in the world map and the swept area robot map created in step (i) each contain data representing a mark.

31. In a robot system incorporating a plurality of robots movable along a common platen surface, each robot including means for moving the robot along said platen in mutually perpendicular directions, collision detection apparatus comprising:

memory means for storing two-dimensional representations of said robot projected onto the surface of said platen and comprised of memory sections having memory cells for storing binary data, the memory cells being of a number sufficient to represent an xy grid of uniform sized squares each representing a predetermined area along said platen surface; said memory being divided into a world map memory section and a plurality of robot map sections each memory section being representative of the surface area of said platen;

means for installing a two-dimensional representation of the initial position of each robot in its associated robot map by inserting a binary bit of a predetermined binary state into those memory cells representing square areas touched by the two-dimensional representation of the associated robot;

means for combining the robot maps with the world map by installing the binary states of the memory cells in each robot map into the memory cells representing the world map;

means responsive to a request for movement of a predetermined robot for removing the representation of the initial position of said predetermined robot from the world map by combining the binary data in the associated memory cells of the predetermined robot map and the world map in a logical operation;

means for creating a robot swept area map representative of the two-dimensional region occupied by the said predetermined robot and moving from its initial position to a desired final position by inserting binary bits of said predetermined binary state into those memory cells touched by the swept area;

first means for combining the robot swept area into the world map by combining the binary data of the associated memory cells of the swept area robot map and world map in a first type of logical ORing operation;

second means for combining the binary data in the memory cells of the swept area robot map with the binary data in the associated memory cells of the world map employing a second type of logical ORing operation;

means for comparing the binary data of associated memory cells resulting from the two last-mentioned logical ORing operations, including means for indicating a collision in the event that the binary states of associated memory locations are unequal.

32. The apparatus of claim 31 further comprising means for providing an allocation signal when the data compared by said comparison means is equal.

33. The apparatus of claim 32 further comprising:

means for inserting the binary data generated by said second combining means responsive to said allocation signal.

34. The apparatus of claim 31 wherein said robot system comprises a conductive platen and each of said robots comprises xy forcer means for generating electro-magnetic fields in mutually perpendicular directions to propel the robot along said platen.

35. The apparatus of claim 34 further comprising means for driving said robots including an umbilical cord for coupling drive signals to said xy forcer means.

36. The apparatus of claim 35 wherein said means for generating said robot swept area map further includes means for installing a two-dimensional representation of the robot means umbilical cord in said robot swept area map by inserting binary bits of said predetermined binary state into those memory cells representing squares touched by the two-dimensional projection of the umbilical cord upon the platen surface.

37. The apparatus of claim 31 further comprising:

means for generating a collision signal when the data compared by said comparison means is unequal;

means for removing a swept area two-dimensional representation of a robot from said world map by combining the binary data of the memory cells associated with said robot swept area map with the binary data contained in the memory cells representing said world map employing a predetermined logical ORing operation;

means for installing the two-dimensional representation of the initial position of the robot whose swept area has indicated a collision condition by combining the binary data in the memory cells representing the robot initial position with the binary data in the memory cells representing said world map, employing a predetermined type of logical OR operation.

38. The apparatus of claim 31 wherein one of said logical OR operations comprises an exclusive OR operation.

39. The apparatus of claim 31 wherein one of said logical OR operations comprises an inclusive-OR operation.

40. The apparatus of claim 31 wherein one of said logical OR operations comprises an exclusive-OR operation and the other one of said logical OR operations comprises an inclusive-OR operation.

41. The apparatus of claim 31 wherein said predetermined binary state comprises a binary one state.

* * * * *

UNITED STATES PATENT AND TRADEMARK OFFICE
CERTIFICATE OF CORRECTION

PATENT NO. : 5,150,452
DATED : September 22, 1992
INVENTOR(S) : Pollack et al.

It is certified that error appears in the above-identified patent and that said Letters Patent is hereby corrected as shown below:

Column 11, line 51, change "corq" to --cord--

Column 14, line 14, after "space," insert --the world map is selectively erased by--

Column 15, line 60, change "met" to --method for a--

Column 15, line 62, after "size" insert --:--

Column 16, line 24, before "combining" insert --(g)--

Column 18, line 18, change "square a" to --squares--

Column 19, line 1, change "presenting" to --representing--

Signed and Sealed this

Fifth Day of October, 1993

*Attest:*

BRUCE LEHMAN

*Attesting Officer*     Commissioner of Patents and Trademarks